US010511706B2

(12) United States Patent
Lee et al.

(10) Patent No.: US 10,511,706 B2
(45) Date of Patent: Dec. 17, 2019

(54) METHOD AND SYSTEM FOR CONTEXT-AWARE PERSUASIVE INTERACTION RESTRAINT TO INTERVENE SMART DEVICE USE

(71) Applicant: Korea Advanced Institute of Science and Technology, Daejeon (KR)

(72) Inventors: Uichin Lee, Daejeon (KR); Joonyoung Park, Daejeon (KR); Jaejeung Kim, Daejeon (KR); Inyeop Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/134,800

(22) Filed: Sep. 18, 2018

(65) Prior Publication Data

US 2019/0260872 A1    Aug. 22, 2019

(30) Foreign Application Priority Data

Feb. 22, 2018    (KR) ........................ 10-2018-0020903

(51) Int. Cl.
*H04M 3/00* (2006.01)
*H04M 1/725* (2006.01)
*H04L 29/08* (2006.01)

(52) U.S. Cl.
CPC ........ *H04M 1/72577* (2013.01); *H04L 67/22* (2013.01)

(58) Field of Classification Search
CPC ..................................................... H04M 15/00
See application file for complete search history.

(56) References Cited

U.S. PATENT DOCUMENTS

| 8,812,960 B1* | 8/2014 | Sun | H04L 61/6077 |
|---|---|---|---|
| | | | 715/757 |
| 2007/0162732 A1* | 7/2007 | Diwan | G06F 11/3419 |
| | | | 713/1 |
| 2008/0075056 A1* | 3/2008 | Thome | H04W 64/006 |
| | | | 370/342 |
| 2011/0117537 A1* | 5/2011 | Funada | G06F 11/3476 |
| | | | 434/365 |

(Continued)

FOREIGN PATENT DOCUMENTS

| KR | 10-2013-0143360 A | 12/2013 |
|---|---|---|
| KR | 10-2016-0035679 A | 4/2016 |

(Continued)

*Primary Examiner* — Shantell L Heiber
(74) *Attorney, Agent, or Firm* — BakerHostetler

(57) ABSTRACT

Disclosed are a persuasive interaction restriction method and system for the intervention of smart device overuse based on context-awareness. A method of restricting an interaction of a smart device based on context awareness is executed by a computer, and may include training a user's interactivity with a smart device and an app installed on the smart device, setting an intervention method related to restriction on the use of the app based on the trained interactivity, recognizing whether context requires intervention based on predetermined interactivity restraint setting information, and restricting the use of the app based on the intervention method set if the context is recognized to require intervention.

19 Claims, 10 Drawing Sheets

(56) References Cited

U.S. PATENT DOCUMENTS

| | | | | |
|---|---|---|---|---|
| 2013/0078994 | A1* | 3/2013 | Jouin | G06F 3/1438 |
| | | | | 455/426.1 |
| 2015/0186669 | A1* | 7/2015 | Nicolaou | G06F 21/6218 |
| | | | | 726/4 |
| 2015/0205595 | A1* | 7/2015 | Dudai | G06F 8/65 |
| | | | | 717/168 |
| 2015/0296074 | A1* | 10/2015 | Shah | H04M 1/72577 |
| | | | | 455/418 |
| 2016/0085763 | A1* | 3/2016 | Tatourian | H04L 67/10 |
| | | | | 707/662 |
| 2017/0262904 | A1* | 9/2017 | O'Herlihy | G06Q 30/0631 |

FOREIGN PATENT DOCUMENTS

| | | |
|---|---|---|
| KR | 10-1666396 B1 | 10/2016 |
| WO | WO 2017/161499 A1 | 9/2017 |

\* cited by examiner

METHOD AND SYSTEM FOR CONTEXT-AWARE PERSUASIVE INTERACTION RESTRAINT TO INTERVENE SMART DEVICE USE

CROSS REFERENCE TO RELATED APPLICATION

The present application claims the benefit of Korean Patent Application No. 10-2018-0020903 filed in the Korean Intellectual Property Office on Feb. 22, 2018, the entire contents of which are incorporated herein by reference.

BACKGROUND OF THE INVENTION

1. Technical Field

Embodiments of the present invention relate to a technology for restricting the use of a smart device and, more particularly, to a technology for restricting excessive use of a smart device that hinders daily life.

2. Description of the Related Art

A smart device, such as a smartphone or a tablet, is widely used in daily life because it can be carried by a user who can access content anywhere and at any time through wireless Internet, and can use various types of interactive content, such as game, through a mobile application (app) store. Due to such high degree accessibility and use of various types of content, users have become used to frequently use the smart devices habitually. The habitual use of the smart device increases seriousness to the extent that the daily life of a user is hindered. A situation in which a user is seriously distracted due to a frequent interaction with the smart device in daily life occurs.

For example, a driver may cause a hitting accident without noticing a pedestrian while manipulating a smart device behind the wheel or may cause a traffic accident without recognizing a lane change of a vehicle that is driving ahead of his or her car.

In a work or study environment, the habitual check of SNS, e-mail, messengers, etc. and frequent mobile game play may lead to a decrease of productivity because the degree of concentration is reduced. As described above, a life endangering incident may occur, or a work in daily life may be negatively influenced due to the distraction of a user attributable to the habitual use or frequent use of the smart device.

In order to restrict the habitual use of the smart device, a method of locking a smartphone in a specific place, such as a school, and a method of selectively locking and unlocking a specific application (app) are used. However, various exception situations are present in daily life, and such a method does not have a substantial control effect because a user can release the locking of the smartphone at any time.

Accordingly, there is a need for a technology which provides use permission, but restricts an excessive use of the smart device by applying forcibleness of a proper level.

Korean Patent No. 10-1666396 relates to a service use restriction device and method based on user addiction. This patent discloses a service setting device for generating the service use tendency of a user based on service use information of the user, determining whether the user corresponds to service use addiction based on the service use tendency, and setting service restraint configuration information for providing a restricted service based on a result of the determination of the service use addiction and a service provision device for providing at least one of a normal service and a restricted service to a corresponding user based on service restraint setting information set in a service setting device.

SUMMARY OF THE INVENTION

Accordingly, the present invention has been made keeping in mind the above problems occurring in the prior art, and an object of the present invention is to provide a technology for permitting the use of a smart device based on context awareness, but restricting an excessive use of the smart device in a varying proper level of restriction (i.e., with varying restriction strength) based on context. That is, the present invention relates to a technology for preventing a situation in which daily life is hindered, by providing a restrictive mechanism that can reduce the interactivity of a smart device.

A method of restricting an interaction of a smart device based on context awareness is executed by a computer, and may include training a user's interactivity with a smart device and an app installed on the smart device, setting an intervention method related to restriction on the use of the app based on the trained interactivity, recognizing whether context requires intervention based on predetermined interactivity restraint setting information, and restricting the use of the app based on the intervention method set if the context recognized requires triggering the intervention.

In accordance with an aspect, setting the intervention method may include defining a contextual element indicative of the context in which the intervention is necessary and setting interactivity restriction based on interactivity trained in relation to the contextual element.

In accordance with another aspect, training the interactivity may include training an app start time corresponding to the time until a main screen related to the app is displayed after the app is selected.

In accordance with yet another aspect, training the interactivity may include training an interface transition time, that is, the time taken to move between a plurality of interfaces predetermined in relation to the app.

In accordance with yet another aspect, training the interactivity may include training the time taken to perform an interaction in a corresponding user interface with respect to a plurality of user interfaces predetermined in relation to the app.

In accordance with yet another aspect, training the interactivity may include training a computational workload taken to perform a task related to a corresponding user interface and the time taken to complete the task with respect to a plurality of user interfaces predetermined in relation to the app.

In accordance with yet another aspect, setting the intervention method may include setting the intervention method based on at least one of the use time and use number of the app.

In accordance with yet another aspect, restricting the use of the app may include delaying at least one of the start time of the app, a transition time between a plurality of user interfaces predetermined in relation to the app, and a response time for a user input related to the app.

In accordance with yet another aspect, restricting the use of the app may include delaying a network input and output (IO) speed for providing information provided as a response to data requested in relation to the app.

In accordance with yet another aspect, restricting the use of the app may include providing a predetermined extra task at the start time of an app corresponding to the context in which the intervention is necessary when the start of the corresponding app is requested.

In accordance with yet another aspect, the extra task with varying cognitive or physical workload may include at least one of a mathematical problem, a puzzle, typing, exercising and walking.

In accordance with yet another aspect, the intervention method may vary depending on at least one of the use time and use number of the app.

A system for restricting an interaction of a smart device based on context awareness may include a training unit configured to train interactivity between a smart device and use of an app installed on the smart device, an intervention method setting unit configured to set an intervention method related to restriction on the use of the app based on the trained interactivity, a context awareness unit configured to recognize whether context requires intervention based on predetermined interactivity setting information, and a use restriction controller configured to restrict the use of the app based on the intervention method set if the context is recognized to require intervention.

In accordance with an aspect, the intervention method setting unit may define a contextual element indicative of the context in which the intervention is necessary and set interactivity restriction based on interactivity trained in relation to the contextual element.

In accordance with another aspect, the training unit may train an app start time corresponding to a time until a main screen related to the app is displayed after the app is selected.

In accordance with yet another aspect, the training unit may train an interface transition time which is the time taken to move between a plurality of interfaces predetermined in relation to the app.

In accordance with yet another aspect, the training unit may train the time taken to perform an interaction in a corresponding user interface with respect to a plurality of user interfaces predetermined in relation to the app.

In accordance with yet another aspect, the training unit may train a computational workload taken to perform a task related to a corresponding user interface and the time taken to complete the task with respect to a plurality of user interfaces predetermined in relation to the app.

In accordance with yet another aspect, the intervention method setting unit may set the intervention method based on at least one of a use time and use number of the app. The intervention method may have restriction strength varying depending on at least one of the use time and use number of the app.

In accordance with yet another aspect, the use restriction controller may delay at least one of the start time of the app, a transition time between a plurality of user interfaces predetermined in relation to the app, a response time for a user input related to the app, and a network I/O speed for providing information provided as a response to data requested in relation to the app.

DETAILED DESCRIPTION

Hereinafter, embodiments of the present invention are described in detail with reference to the accompanying drawings.

The present embodiments relate to a technology for restricting an excessive use of a smart device to the extent that daily life of a user who owns the smart device is hindered, that is, a habitual use and/or frequent use of the smart phone, based on context awareness. In particular, the present embodiments relate to a technology for defining or training interactivity between a user (i.e., smart device) and a specific app installed on the smart device, and restricting the use of the specific app installed on the smart device with different restriction strength according to context based on the interactivity.

In the present embodiments, a smart device indicates a smart terminal. The smart device is an electronic device possessed, carried, or worn by a user, such as a smartphone, a tablet or a smart watch, and may indicate an electronic device which supports a plurality of wireless networking.

In the present embodiments, context in which restriction on the use of a specific app is necessary may indicate context in which intervention is necessary between a user and the app (or the smart device).

In the present embodiments, an example in which the use of a specific app is restricted with different strength depending on context in which restriction on the use of the specific app is recognized has described, but this corresponds to an embodiment. The present embodiments may also be applied to an example in which a lockout function is set so that a specific app cannot be used in a specific situation, time and/or place. Furthermore, the lockout may be automatically released if a corresponding user leaves the specific context, time and/or place.

Figure 1:
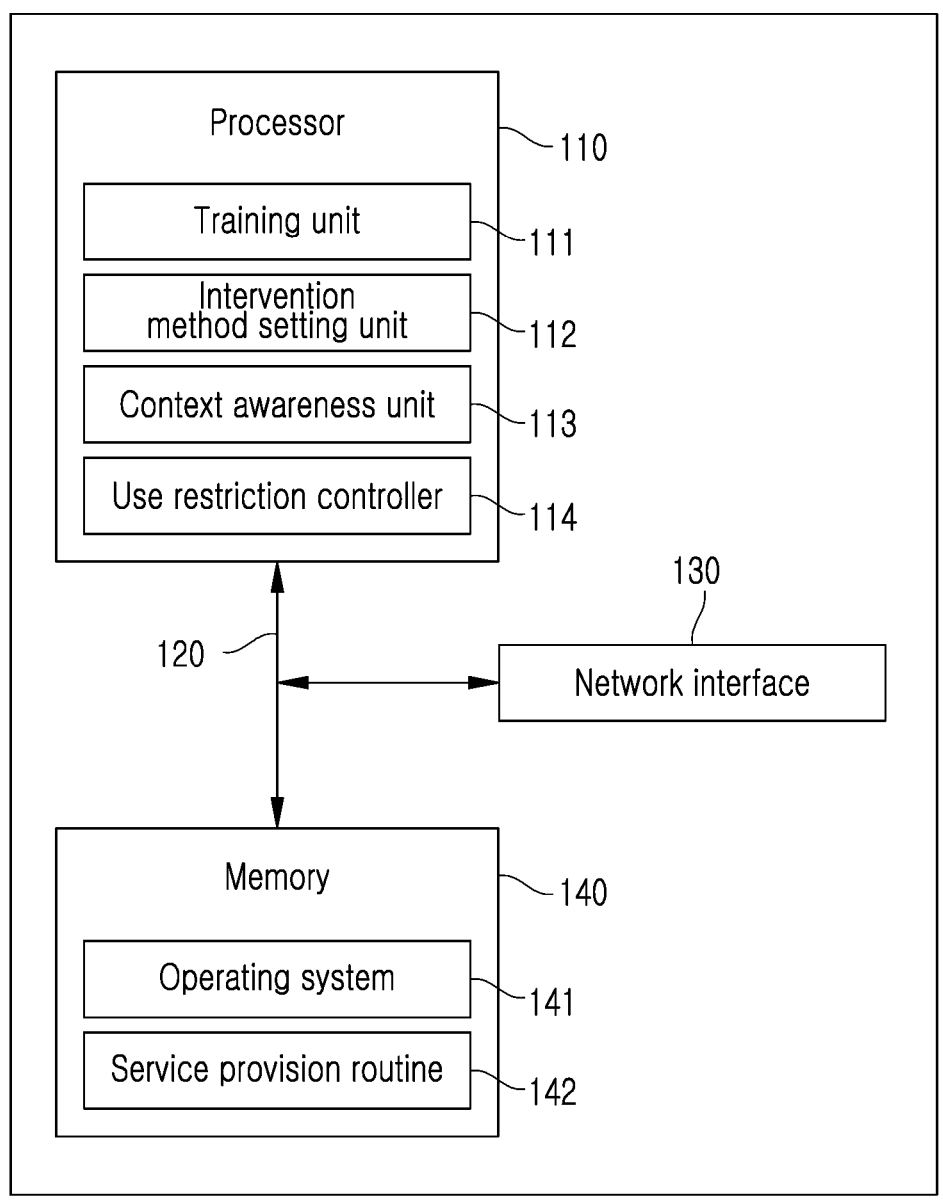
FIG. 1 is a flowchart showing a method of restricting an interaction of a smart device based on contextual awareness in an embodiment of the present invention.
Figure 2:
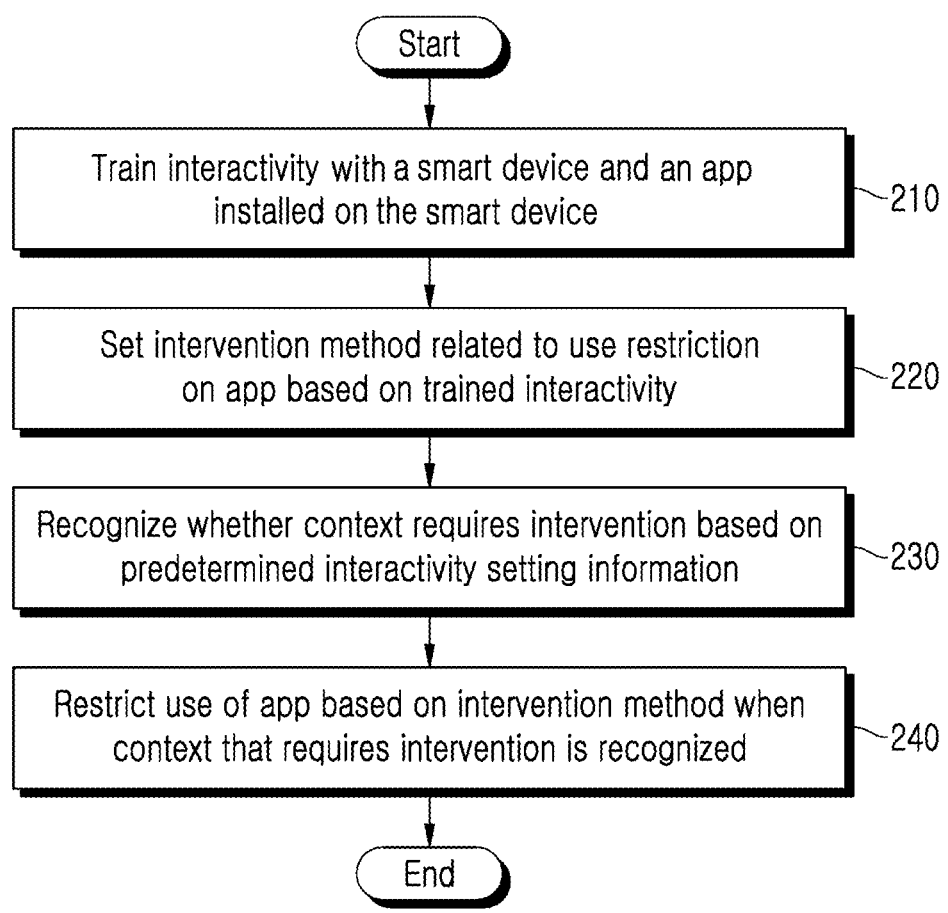
FIG. 2 is a block diagram showing the internal configuration of an interaction restriction system in an embodiment of the present invention.

FIG. 1 is a flowchart showing a method of restricting an interaction of a smart device based on contextual awareness in an embodiment of the present invention. FIG. 2 is a block diagram showing the internal configuration of an interaction restriction system in an embodiment of the present invention.

The interaction restriction system 100 according to the present embodiment may include a processor 110, a bus 120, a network interface 130 and memory 140. The memory 140 may include an operating system 141 and a service provision routine 142. The processor 110 may include a training unit 111, an intervention method setting unit 112, a context awareness unit 113 and a use restriction controller 114. In other embodiments, the interaction restriction system 100 may include more elements than the elements of FIG. 1. However, most of conventional elements do not need to be clearly described. For example, the interaction restriction system 100 may include other elements, such as a display and a transceiver.

The memory 140 is a computer-readable recording medium and may include a permanent mass storage device, such as random access memory (RAM), read only memory (ROM) and a disk drive. Furthermore, the memory 140 may store program code for the operating system 141 and the service provision routine 142. Such software elements may be loaded from a computer-readable recording medium separate from the memory 140 using a drive mechanism (not shown). The separate computer-readable recording medium may include computer-readable recording media (not shown), such as a floppy drive, a disk, a tape, a DVD/CD-ROM drive and a memory card. In another embodiment, the software elements may be loaded onto the memory 140 through the network interface 130 other than a computer-readable recording medium.

The bus 120 may enable communication and data transmission between the elements of the interaction restriction system 100. The bus 120 may be configured using a high-speed serial bus, a parallel bus, a storage area network (SAN) and/or a different proper communication technology.

The network interface 130 may be a computer hardware element for connecting the interaction restriction system 100 to a computer network. The network interface 130 may connect the interaction restriction system 100 to a computer network through a wired or wireless connection.

The processor 110 may be configured to process instructions of a computer program by performing basic arithmetic and logic and the I/O operation of the interaction restriction system 100. The instructions may be provided to the processor 110 by the memory 140 or the network interface 130 and through the bus 120. The processor 110 may be configured to execute program code for the training unit 111, the intervention method setting unit 112, the context awareness unit 113 and the use restriction controller 114. The program code may be stored in a recording device, such as the memory 140.

The training unit 111, the intervention method setting unit 112, the context awareness unit 113 and the use restriction controller 114 may be configured to perform steps 210 to 240 of FIG. 2.

In step 210, the training unit 111 may train interactivity between a smart device and the use of an app installed on the smart device. That is, the training unit 111 may train interactivity between a user and a specific app, which occurs as the user uses the specific app installed on a smart device.

For example, the interactivity between the user and the specific app in a smart device may occur when the specific app starts or ends, when an interface transition is performed between a plurality of user interfaces predetermined in relation to the specific app, when a user input, such as keyword entry or information selection, is generated in relation to the specific app, or when output (e.g., the playback of video or the display of search results on a screen) is generated as a response to a user input. In addition, the interactivity may occur when a network is used in relation to the use of a specific app, or when calculation for operation processing related to a specific app is performed. Accordingly, the interactivity between a specific app and a user may be previously defined once at the beginning, and may be trained and updated based on use history information collected as the user uses the specific app. That is, the interactivity may be measured through the observation (i.e., monitoring) of all of prior interactions between a user and a device in the operating system level of a smart device. As described above, the interactivity may incorporate a user's experiences felt when the user interacts with an app installed on a smart device in usual contexts in which restrictive control is not necessary. Hereinafter, an example in which interactivity is trained is described, but this corresponds to an embodiment. The start time, the end time, the interface transition time, the time taken for computation, and the time taken to perform a task related to a user interface over a network in relation to an app may be defined by a user, and may continue to be used until the defined values are changed by the user. If the user modifies the value, the value may be updated with the modified value.

For example, when a specific app is executed, the time taken for the main screen of the specific app to be displayed on a screen so that a major interaction provided to the specific app by a user is possible may correspond to the start time (i.e., service start time) of the app. This time may include the time taken for temporarily displaying a flash screen of the app. The training unit 111 may train a different start time for each app, may match it with identifier information of a corresponding app, and may store and retain the matched information.

For another example, the training unit 111 may train a page or interface transition time, that is, the time taken to move between a plurality of user interfaces predetermined in relation to a specific app. The specific app includes one or more user interfaces. An interface transition from a specific user interface to another user interface may occur in response to a user's input or according to a method predetermined in the specific app. For example, an interface transition may occur from a user interface for providing product information when a buy button is selected to a user interface for entering card information and to a user interface for automatic payment when the card information is entered. In addition, an interface transition may occur in various forms, such as an interface transition to a user interface for providing a result of search when a keyword is entered.

For yet another example, the training unit 111 may train the time taken to perform a task related to a corresponding interface based on a network with respect to a plurality of user interfaces predetermined in relation to a specific app. That is, the training unit 111 may train the time taken for a user to perform a task designated in a corresponding user interface of a specific app in normal context in which use restriction on an app is not applied. For example, the training unit 111 may train the time taken to send a Kakao Talk message, that is, any operation performed over a network, and the time taken to play back/download a file, such as music and video.

For yet another example, the training unit 111 may train a computational load necessary to perform a task related to a corresponding user interface and the time taken to complete the calculation with respect to a plurality of user interfaces predetermined in relation to a specific app. That is, in normal context in which use restriction on an app is not applied, a computational load that must be provided by a smart device in order to perform a corresponding task when the user performs a task designated in a specific user interface of a specific app (e.g., an address information input for product purchase, an ad view for selecting a game item, or the selection of a button for file playback), and an average time taken to complete the execution may be trained.

For yet another example, the training unit 111 may train a user input time occurring in association with a specific app. For example, the training unit 111 may train the time taken to select a specific object previously defined in a specific user interface of a specific app through a touch, the time taken to enter a keyword in a keyword entry window, and so on.

In step 220, the intervention method setting unit 222 may set an intervention method related to use restriction on the app based on the trained interactivity.

In step 221, the intervention method setting unit 222 may define a contextual element indicative of context in which the intervention is necessary.

In step 222, the intervention method setting unit 222 may set interactivity restriction based on the trained interactivity in relation to the contextual element.

For example, the contextual element may include at least one of personal, social, environmental, temporal and interactive context. For example, in the case of context in which a class is performed, the contextual element may include time and environmental elements because the class is performed at a designated place on a predetermined time. In the case of library learning, the contextual element may further include a place element in addition to time and environmental elements because learning is performed at a predetermined place, such as the inside of a reading room.

In addition, an interactional context is based on interaction history with a smart device, and a contextual element that requires intervention may be defined based on interaction history data. For example, the time when a specific app is finally used may be used as a contextual element that requires intervention. That is, in order to restrict a frequent use, the interval between the time when a specific app is finally used and the time when the corresponding app is started again may be defined and used as a contextual element. For example, in context in which restriction is not applied to the use of a specific app, a difference value between the time when the specific app is finally used and the time when the corresponding app is started again may be calculated. The calculated difference value may be used as an interval. The interval may be set as an average of a plurality of difference values collected during a specific period in addition to one calculation of a difference value. That is, in normal context, an average time taken to start a specific app again after the specific app is ended may be set as the interval. Furthermore, the set interval may be used to recognize whether context requires intervention in relation to the use of the specific app. In other words, the interval may be used as a reference value whether context requires intervention in relation to the corresponding app.

In this case, interactivity restriction for restricting the use of the specific app with different strength may be set based on the interval.

In step 230, the context awareness unit 113 may recognize whether context requires intervention based on predetermined interactivity setting information. In this case, the interactivity setting information may include a time interval and number and may be set in response to user selection.

For example, if interactivity setting information is set as a time interval, the context awareness unit 113 may calculate a difference value between the time when a specific app is finally used (i.e., end time) and the time when the specific app is started again at a point of time when the specific app is to be started. Furthermore, the context awareness unit 113 may recognize whether context requires intervention based on the calculated difference value and the interval set in association with the specific app. For example, if the difference value is smaller than the interval, the context awareness unit 113 may recognize whether context require intervention.

In this case, the context awareness unit 113 may recognize intervention strength depending on how the difference value is smaller than the interval. That is, the context awareness unit 113 may recognize intervention strength to which interactivity restriction will be applied based on a level to which the difference value belongs. For example, the context awareness unit 113 may recognize that the intervention strength is "strong" if the difference value corresponds to 10 minutes or less, that the intervention strength is "middle" if the difference value corresponds to 20 minutes or less, and that the intervention strength is "weak" if the difference value corresponds to 30 minutes or less.

For another example, if interactivity setting information is set as the number of use times, the context awareness unit 113 may recognize whether context requires intervention based on the number of times that a specific app is counted whenever it is executed and a reference number. In this case, the reference number may be calculated as an average of the numbers of times counted when the specific app is executed, collected during a specific period in normal context, and may be designated by an administrator or user. In this case, the context awareness unit 113 may recognize whether intervention strength corresponds to "strong", "middle" or "weak" depending on the number of times that the specific app is executed.

For yet another example, whether intervention is necessary may be recognized by applying both a time interval and an execution number. For example, if a specific app starts again in 20 minutes or less and an execution number corresponds to 10 times, the intervention strength may be determined to be "strong", that is, a level relatively higher than the middle, that is, intervention strength related to the specific app, in 20 minutes or less.

In step 240, when context that requires intervention is recognized, the use restriction controller 114 may restrict use of the app based on the intervention method. In this case, the use restriction controller 114 may control the corresponding app so that interactivity restriction (i.e., restriction on the use of the corresponding app) previously set in relation to the corresponding app is applied based on the intervention method.

For example, the use restriction controller 114 may restrict interactivity by controlling to delay at least one of the start time of a specific app, a transition time between a plurality of user interfaces predetermined in relation to the specific app, and a response time for a user input related to the specific app.

For another example, the use restriction controller 114 may restrict interactivity related to a corresponding app by controlling to delay the network I/O speed for providing information provided as a response to data requested in relation to the corresponding app.

Furthermore, the use restriction controller 114 may be used to recognize whether context requires intervention based on the interval when a specific app is started again.

In addition, the use restriction controller 114 may be controlled to provide an extra task predetermined at the start time of a specific app when the start of the specific app corresponding to context that requires intervention is requested and may be controlled to provide an extra task predetermined at the start time of the specific app.

Figure 3:
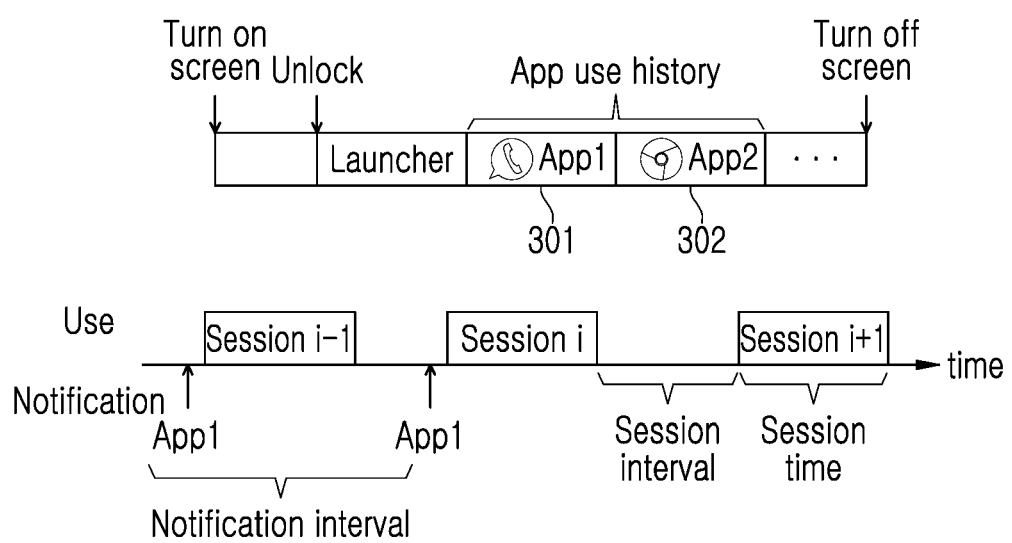
FIG. 3 is a diagram showing an interaction between a smart device and an app in an embodiment of the present invention.

FIG. 3 is a diagram showing an interaction between a smart device and an app in an embodiment of the present invention.

Referring to FIG. 3, the entire contents of use of each of an app 1 301 and an app 2 302 may be profiled. In this case, the transition between user interfaces may be tracked with respect to a specific app (e.g., app 1 301).

If the intervention of a specific app is necessary in a smart device and thus frequency of use of the specific app must be controlled, a difference value (i.e., session interval) between the last use time (i.e., end time) of the specific app and the time when the specific app starts again may be used as a criterion for use restriction on the specific app. In this case, frequency of use may include a use time interval and an execution number. In this case, the use of the specific app may be restricted based on a use time in addition to frequency of use.

For example, if a target time is set to 1 hour, context in which intervention is necessary may be recognized as the time from the time when a specific app starts to the time when the specific app ends becomes 1 hour, and interactivity restriction may be applied in relation to the specific app.

In this case, if context in which the specific app requires intervention is recognized based on frequency of use and the use time, the use restriction controller 114 may control to apply preset interactivity restriction in relation to the specific app.

For example, the interactivity restriction is set to reduce the frequent use of a specific app. The start time of a specific app may be set as 5-second delay, 10-second delay or 20-second delay depending on a time interval. For example, if the Facebook app is frequently used, the Facebook start time may be set as 5-second delay, 10-second delay or 20-second delay based on frequency of checking (i.e., execution number) so that the frequent execution can be hindered. In this case, a time interval may be confirmed. For example, the interactivity restriction may be set to be inversely proportional to the time interval between two consecutive Facebook use. As the time interval becomes shorter, the longer will be the delay. For example, the interactivity restriction may be variably set so that 15-second delay is applied if the Facebook app is executed in 1 minute and 5-second delay is applied if the Facebook app is executed in 10 minutes. In this case, the delay is used as the interactivity restriction, and the delay may be set based on a predefined exponential function, or a simple conversion table as shown above.

In addition, an interface transition time may be set to be delayed. The interface transition time may be set to have a different delay time depending on a time interval. For example, in Kakao Talk, if interactivity restriction is applied when a user continues to repeatedly chat with several persons while moving between user interfaces, the interactivity restriction may be set depending on a time interval so that 5-second delay, 10-second delay or 20-second delay, for example, is applied when the user moves between the user interfaces.

For another example, the interactivity restriction may be set to delay the input time of a user and an output time (i.e., response time) that responds as a response to the input of the user. For example, when a chat text is entered into a user interface provided by Kakao Talk, the time when the chat text is displayed in the dialogue box of the user interface may be set to be differently delayed such as 5 seconds, 10 seconds or 20 seconds depending on a time interval.

For yet another example, a network I/O speed may be set to be delayed in relation to a specific app. For example, when Youtube video, 1-person broadcasting or real-time relay broadcasting is watched or downloaded, the network speed may be set to be relatively more reduced than that of a normal environment (i.e., environment in which interactivity restriction is not applied). In this case, the network I/O speed may also be set to have different delay depending on a time interval.

For yet another example, interactivity restriction related to a specific app may be set to provide an extra task predetermined at the start time of the specific app.

In this case, if the interactivity restriction has been set as the extra task, when the interactivity restriction is applied, a pop-up message or a separated user interface may be displayed on a screen of a smart device. For example, a pop-up window or page "Interactivity restriction is now applied to a corresponding app due to an excessive use" may be displayed on a screen of a smart device that attempts to drive the corresponding app. In this case, interactivity restriction setting information may be displayed on the screen. For example, information, such as "Start time is delayed for 5 seconds", "Start time and interface transition time are delayed for 5 seconds" or "Start time and interface transition time are delayed for 5 seconds and an extra task must be performed" may be displayed on the screen.

Figure 4:
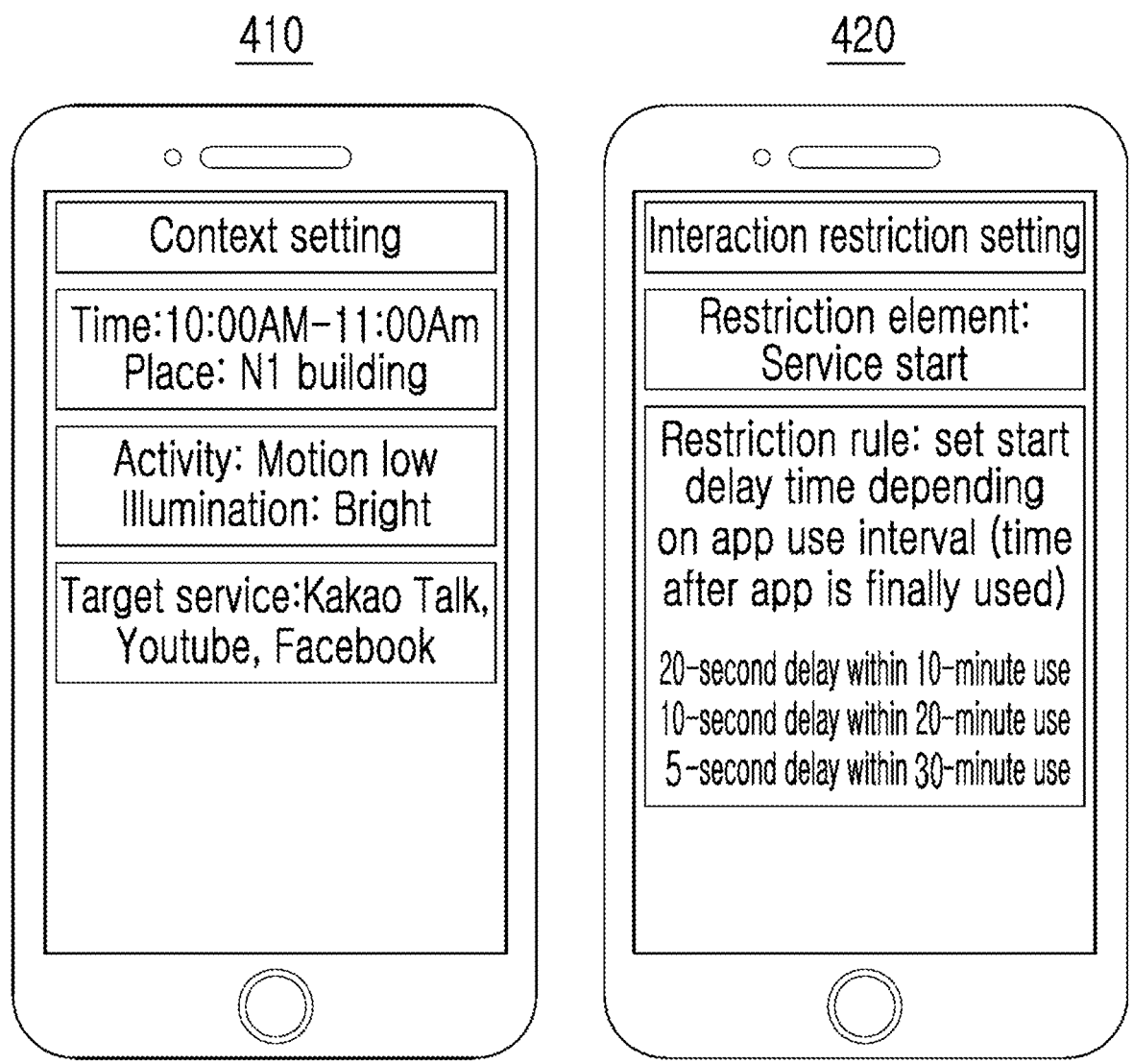
FIG. 4 is a diagram showing a screen in which interaction restriction is set in an embodiment of the present invention.

FIG. 4 is a diagram showing a screen in which interactivity restriction is set in an embodiment of the present invention.

Referring to FIG. 4, a screen 410 may include at least one app selected to apply interactivity restriction. For example, a user may select three apps: Kakao Talk, Youtube and Facebook in order to apply interactivity restriction to the three apps. In this case, when a plurality of apps installed on a smart device is displayed on a screen of the smart device and a check box indicated aside each app or each app itself is selected through a user touch, the selected app may be displayed along with the screen 410.

Referring to the screen 420, an interactivity restriction element to be applied to each selected app may be selected. For example, the interactivity restriction element, such as whether the start time of an app will be restricted, whether the end time of the app will be restricted, whether an interface transition time will be restricted, whether the network I/O speed will be restricted or whether an extra task will be provided at an app start time, may be selected. The selected restriction element may be set to be identically applied to all of selected apps or a different restriction element may be set to be applied to each app. In this case, a plurality of restriction elements other than one restriction element may be selected. That is, for the purpose of interactivity restriction on Facebook, the start time and interface transition time of Facebook may be selected as restriction elements. In addition, an extra task and/or an interface transition time may be selected as the restriction element.

In this case, intervention strength may be differently set based on a level for each selected restriction element. For example, if the start time of an app is selected, the intervention strength may be set to apply 20-second delay when a time interval is within 10 minutes, 10-second delay when the time interval is within 20 minutes, and 5-second delay when the time interval is within 30 minutes.

Figure 5:
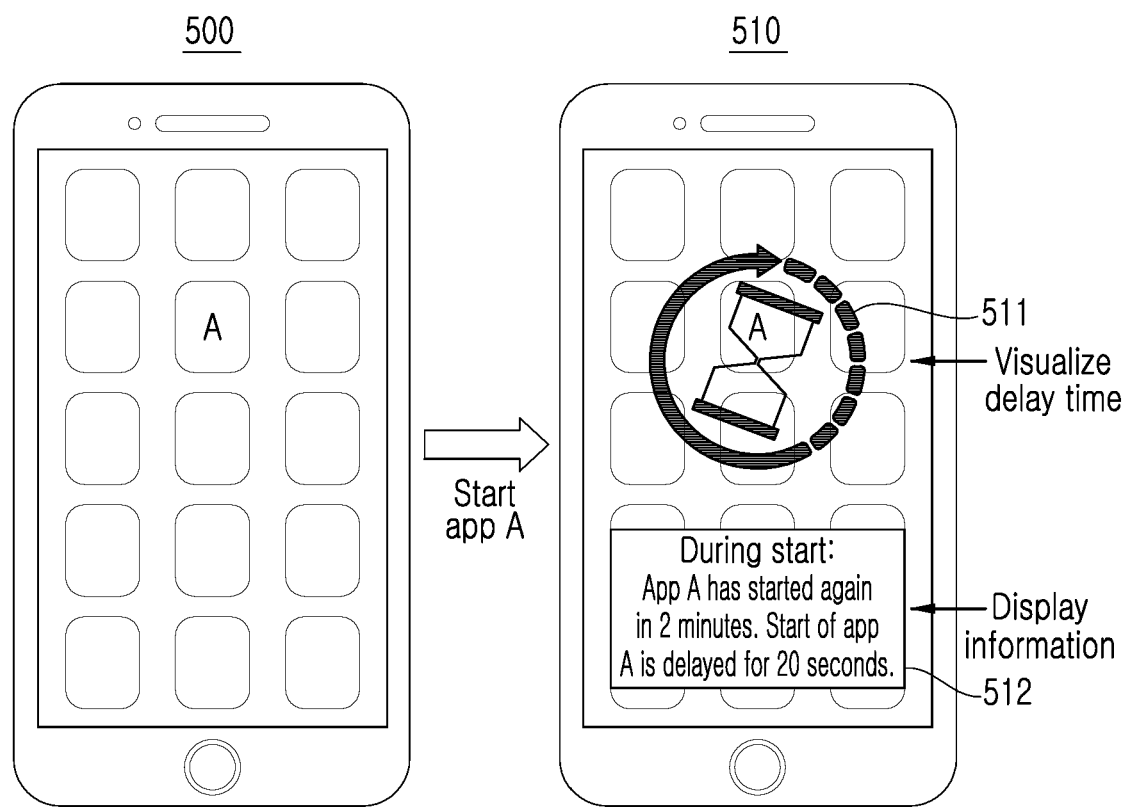
FIG. 5 is a diagram showing a screen configuration in which the start time of an app is restricted in an embodiment of the present invention.

FIG. 5 is a diagram showing a screen configuration in which the start time of an app is restricted in an embodiment of the present invention.

Referring to FIG. 5, when the execution of a specific app (app A) is requested, the context awareness unit 113 may recognize whether context requires the intervention of the specific app based on at least one of frequency of use (i.e., time interval and/or execution number) and a use time.

If the context is recognized to require the intervention of the specific app, the context restriction controller 114 may confirm an interactivity restriction element set in the specific app based on identifier information of the specific app. Furthermore, the context restriction controller 114 may perform control so that a restriction element set based on intervention strength belonging to the specific app is applied based on at least one of frequency of use (i.e., time interval and/or execution number) and a use time. For example, if the app A is used again in 2 minutes, the start time of the app A may be restricted so that the app is delayed for 20 seconds. In this case, the context restriction controller 114 may perform control so that display information (e.g., image 511 showing that sands flows from top to bottom in the rotation screen of a sandglass) indicating that the start time is delayed is displayed on a screen 510. Furthermore, the context restriction controller 114 may perform control so that a message, such as that "App A is used again in 2 minutes and the start of the app A will be delayed for 20 seconds", is displayed on the screen 510 along with the display information 511.

Figure 6:
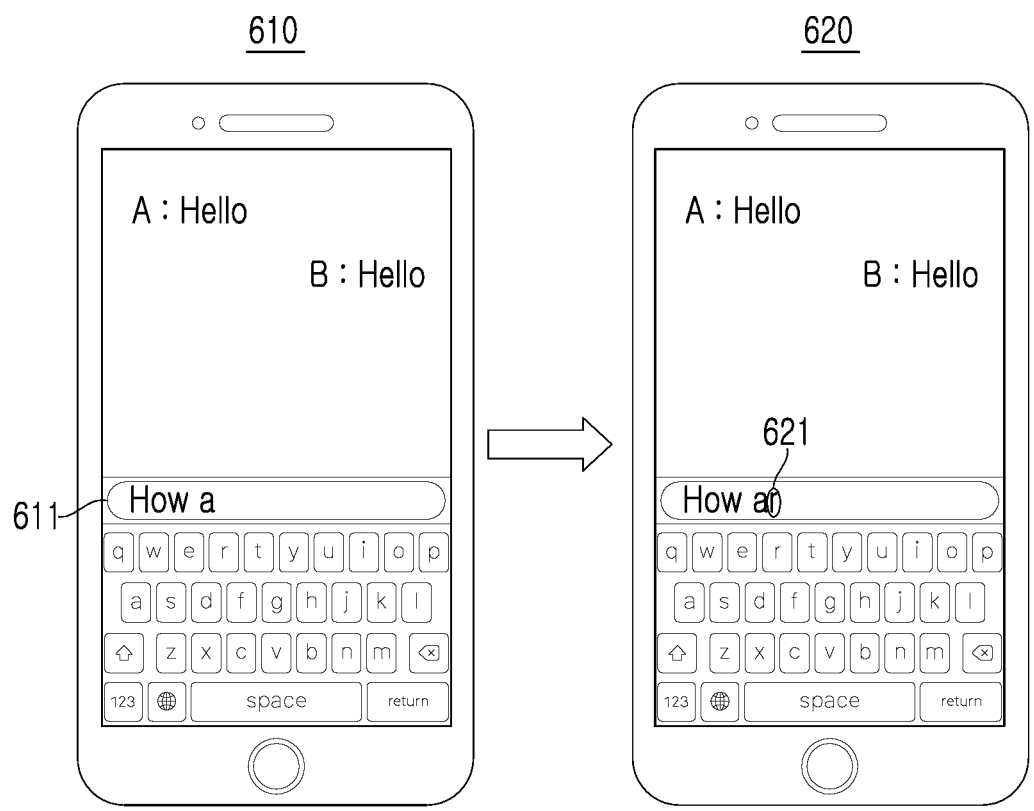
FIG. 6 is a diagram showing a screen configuration in which a user input time is restricted in an embodiment of the present invention.

FIG. 6 is a diagram showing a screen configuration in which a user input time is restricted in an embodiment of the present invention.

Referring to a screen 610 of FIG. 6, if "How are you" is to be entered through a dialogue input window 611 of an instant messenger, such as Kakao Talk or Line, the context restriction controller 114 may perform control so that the time taken to display "r" on a screen 620 after "r" is entered in the dialogue input window 611 of the screen 610 is delayed for a preset time (e.g., 10 seconds) and "r" is displayed (621). That is, in normal context, when "r" is entered in the dialogue input window 611 of the screen 610, "r" is displayed on the screen 620 within 0.1 second. In contrast, if interactivity restriction is applied, "r" may be displayed on the screen 620 in 1 second, 5 seconds or 10 seconds, for example, based on intervention strength after "r" is entered.

Figure 7:
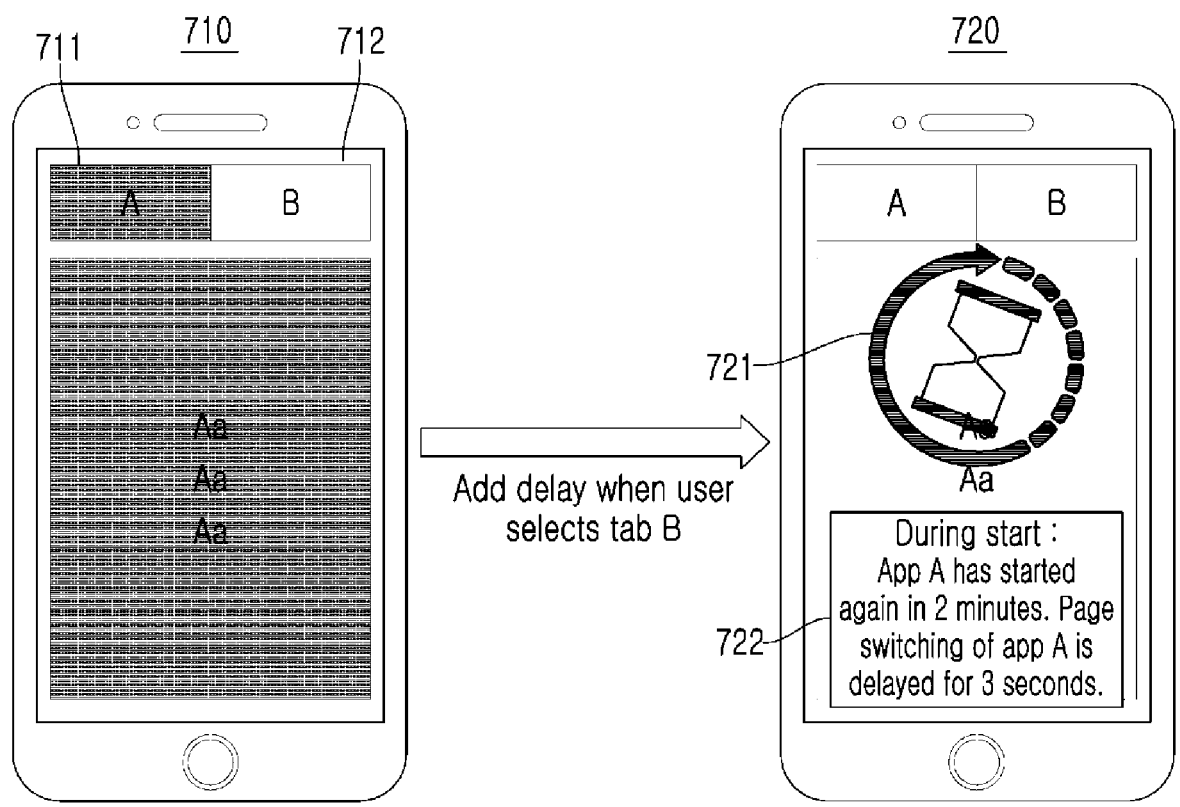
FIG. 7 is a diagram showing a screen configuration in which an interface transition time is restricted in an embodiment of the present invention.

FIG. 7 is a diagram showing a screen configuration in which an interface transition time is restricted in an embodiment of the present invention.

Referring to a screen 710 of FIG. 7, pages predetermined in a specific app may be classified into tabs and displayed on the screen 710.

When a tab B 712 corresponding to a page B is selected through a separate touch in the state in which information corresponding to a current page A 711 has been displayed on the screen 710, a page transfer, that is, page switching, may be performed. At this time, if a corresponding app requires intervention, when the page transfer is performed, that is, when the page A switches to the page B, the context restriction controller 114 may perform control so that the page A does not immediately switch to the page B, but switches to the page B after delay corresponding to a predetermined delay time is applied as in a screen 720.

At this time, the context restriction controller 114 may display information 722, indicating that interactivity restriction is applied when the page transfer is performed, and display information 721 on the screen 720. Furthermore, after 3 seconds, for example, elapse, information belonging to the page B may be displayed on the screen 720.

Figure 8:
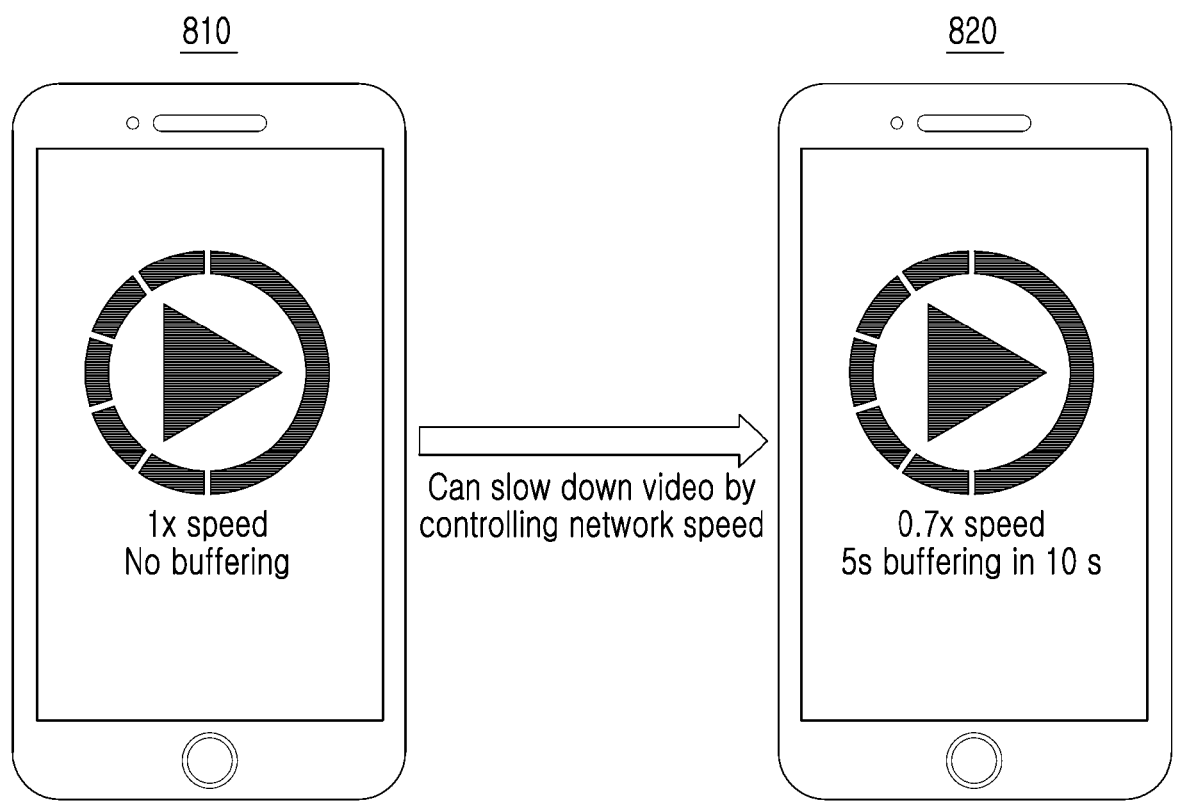
FIG. 8 is a diagram showing a screen configuration in which a network input and output (I/O) speed is restricted in an embodiment of the present invention.

FIG. 8 is a diagram showing a screen configuration in which a network I/O speed is restricted in an embodiment of the present invention.

Referring to a screen 810 of FIG. 8, when video A is played back, playback of 1 double-speed (x) is supported without buffering in normal context. In contrast, if interactivity restriction is applied, the context restriction controller 114 may perform control so that the network I/O speed is decreased by 0.7 double-speed (x) when the video A is played back as in a screen 820.

Figure 9:
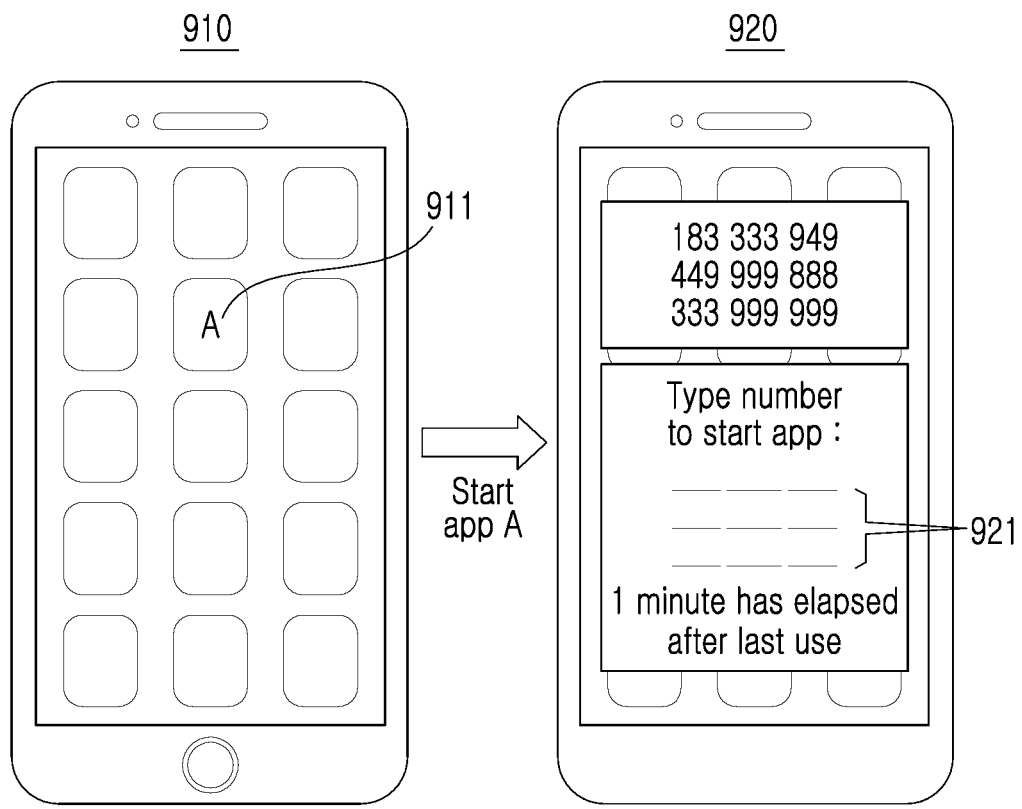
FIGS. 9 and 10 are diagrams showing screen configurations in which interactivity is restricted by providing the execution of an extra task in an embodiment of the present invention.
Figure 10:
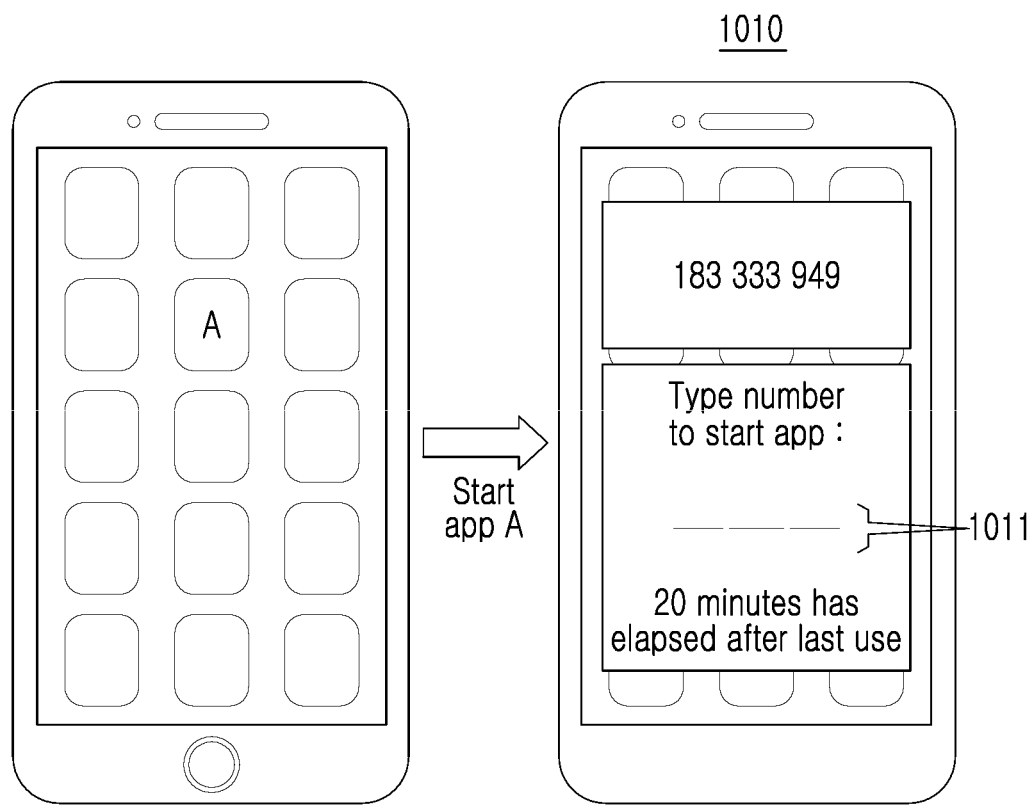

FIGS. 9 and 10 are diagrams showing screen configurations in which interactivity is restricted by providing the execution of an extra task in an embodiment of the present invention.

FIG. 9 may show a screen including an extra task provided when the intervention strength is "strong." FIG. 10 may show a screen including an extra task provided when the intervention strength is "weak."

For example, the extra task with varying cognitive or physical workload may include at least one of a mathematical problem, a puzzle, typing, exercising and walking.

Referring to FIG. 9, if the interval between the time when a specific app 911 is finally used and the time when the specific app is used again is 1 minute and the intervention strength is "strong", the context restriction controller 114 may provide an extra task corresponding to "strong" when the specific app 911 is selected and the specific app is to be started as in a screen 910. For example, the context restriction controller 114 may perform control so that a guidance message to request the entry of information (e.g., a number, text such as English, Chinese or Korean, or letters having a combination of a number, symbol and text) that must be entered to start a corresponding app is displayed on a screen 920 along with the corresponding information. In this case, if the intervention strength is "strong", an extra task that requires the entry 921 of information having three lines relatively greater than that of "weak" or "middle" may be provided.

In this case, if the intervention strength "weak", a guidance message to request the entry 1011 of information relatively smaller than that of "strong" or "middle" as in FIG. 10 may be displayed on the screen 1010.

An extra task that requires a user's physical action may be provided in addition to the extra task that requests the user to enter information in the entry window of a screen while watching a number, text or symbol displayed on the screen of a smart device as described above.

For example, if a specific app that requires intervention is selected and the execution of the specific app is requested, the context restriction controller 114 may provide an extra task, such as "Please shake smart device twenty times", at the start time before the specific app is started. In this case, whether the 20-times shaking of the smart device has been satisfied may be confirmed based on information sensed by a motion sensor included in the smart device, such as an acceleration sensor, an angular velocity sensor or a gyro sensor. If the 20-times shaking is satisfied, the context restriction controller 114 may allow the specific app to be started. If the 20-times shaking is not satisfied, the context restriction controller 114 may perform control so that a message, such as "It is insufficient. Please shake smart device twenty times again" or "It is insufficient. Please shake smart device four more times" corresponding to an insufficient number, for example, is displayed on a screen of the smart device.

The method according to the embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like.

In the embodiments of the present invention, the use of a smart device is permitted based on context awareness, but an excessive use of the smart device is restricted in a proper level (i.e., with varying strength) that varies depending on context. Accordingly, a situation in which a user's daily life is hindered can be prevented while reducing the user' inconvenience.

Furthermore, a user is provided with an opportunity to self-reflect his or the present excessive use situation due to inconvenience of interactivity by improving a degree of use awareness and additionally provided with an extra task in order to reduce interactivity. Accordingly, a user's craving for the use of a smart device can be effectively reduced. That is, the user is encouraged to perform an extra task because it uses short-term memory of the brain which has a very limited capacity for processing information. Accordingly, a craving for the use of a smart device, and its associated imagery can be effectively suppressed because the short-term memory of the brain is reallocated to the extra task, and thus, the craving for usage may be vanished.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of restricting an interaction of a smart device based on context awareness, the method executed by a computer, comprising:
   training a user's interactivity with a smart device and use of an app installed on the smart device based on prior use of the app by a user while no restriction on the use of the app applies;
   setting an intervention method related to restriction on the use of the app based on the trained interactivity, wherein the intervention method is based on an intervention strength;
   recognizing whether context associated only with the app requires intervention based on predetermined interactivity restraint setting information and information on at least one of a use time and a use number of the app, wherein the intervention strength is based on an interval between at least one of the use time and the use number relative to at least one corresponding threshold; and
   restricting the use of the app based on the intervention method set if the context is recognized to require intervention,
   wherein restricting the use of the app comprises reducing all of the interaction of the smart device associated with the app by one or more of:
      delaying at least one of a start time of the app, a transition time between a plurality of user interfaces predetermined in relation to the app, and a response time for a user input related to the app,
      delaying a network I/O speed for providing information provided as a response to data requested in relation to the app, and
      providing a predetermined extra task to the smart device at a start time of a corresponding app based on the context in which the intervention is necessary when start of the corresponding app is requested.

2. The method of claim 1, wherein training the interactivity comprises training an app start time corresponding to a time until a main screen related to the app is displayed after the app is launched, and wherein the interaction of the smart device associated with the app is reduced based on a training result for the app start time.

3. The method of claim 1,
   wherein training the interactivity comprises training an interface transition time which is a time taken to move between a plurality of interfaces predetermined in relation to the app, and
   wherein the interaction of the smart device associated with the app is reduced based on a training result for the interface transition time.

4. The method of claim 1,
   wherein training the interactivity comprises training a time taken to perform an interaction in a corresponding user interface with respect to a plurality of user interfaces predetermined in relation to the app, and
   wherein the interaction of the smart device associated with the app is reduced based on a training result for the time taken to perform the interaction.

5. The method of claim 1,
   wherein training the interactivity comprises training a computational workload taken to perform a task related to a corresponding user interface and a time taken to complete computation with respect to a plurality of user interfaces predetermined in relation to the app, and
   wherein the interaction of the smart device associated with the app is reduced based on a training result for the computation workload and the time taken to complete computation.

6. The method of claim 1, wherein setting the intervention method comprises setting the intervention method based on at least one of a use time and use number of the app.

7. The method of claim 1, wherein the interaction of the smart device associated with the app is reduced by delaying at least one of the start time of the app, the transition time between a plurality of user interfaces predetermined in relation to the app, and the response time for a user input related to the app.

8. The method of claim 1, wherein the interaction of the smart device associated with the app is reduced by delaying the network I/O speed for providing information provided as a response to data requested in relation to the app.

9. The method of claim 1, wherein the interaction of the smart device associated with the app is reduced by providing the predetermined extra task at the start time of the corresponding app.

10. The method of claim 9, wherein the extra task associated with varying cognitive or physical workload including at least one of a mathematical problem, a puzzle, typing, exercising and walking.

11. The method of claim 1, wherein the intervention method varies depending on at least one of the use time and the use number of the app.

12. A system for restricting an interaction of a smart device based on context awareness, the system comprising at least one processor implemented to execute instructions readable in a computer, wherein the at least one processor is configured to:
   train interactivity between a smart device and use of an app installed on the smart device based on prior use of the app by a user while no restriction on the use of the app applies;
   set an intervention method related to restriction on the use of the app based on the trained interactivity, wherein the intervention method is based on an intervention strength;
   recognize whether context associated only with the app requires intervention based on predetermined interactivity restraint setting information and information on at least one of a use time and a use number of the app, wherein the intervention strength is based on an interval between at least one of the use time and the use number relative to at least one corresponding threshold; and
   restrict the use of the app based on the intervention method set if the context is recognized to require intervention
   wherein the processor is further configured to reduce the interaction of the smart device associated with the app by one or more of:
      delaying at least one of a start time of the app, a transition time between a plurality of user interfaces predetermined in relation to the app, and a response time for a user input related to the app,
      delaying a network I/O speed for providing information provided as a response to data requested in relation to the app, and
      providing a predetermined extra task to the smart device at a start time of a corresponding app based on the context in which the intervention is necessary when start of the corresponding app is requested.

13. The system of claim 12, wherein the processor is further configured to define a contextual element indicative of the context in which the intervention is necessary and sets interactivity restriction based on interactivity trained in relation to the contextual element, wherein the at least one corresponding threshold is one of a reference number and an execution number.

14. The system of claim 12,
   wherein the processor is further configured to train an app start time corresponding to a time until a main screen related to the app is displayed after the app is selected, and
   wherein the interaction of the smart device associated with the app is reduced based on a training result for the app start time.

15. The system of claim 12,
   wherein the processor is further configured to train an interface transition time which is a time taken to move between a plurality of interfaces predetermined in relation to the app, and
   wherein the interaction of the smart device associated with the app is reduced based on a training result for the interface transition time.

16. The system of claim 12,
   wherein the processor is further configured to train a time taken to perform an interaction in a corresponding user interface with respect to a plurality of user interfaces predetermined in relation to the app, and
   wherein the interaction of the smart device associated with the app is reduced based on a training result for the time taken to perform the interaction.

17. The system of claim 12,
   wherein the processor is further configured to train a computational workload taken to perform a task related to a corresponding user interface and a time taken to complete calculation with respect to a plurality of user interfaces predetermined in relation to the app, and
   wherein the interaction of the smart device associated with the app is reduced based on a training result for the computation workload and the time taken to complete computation.

18. The system of claim 12, wherein:
   the processor is further configured to set the intervention method based on at least one of the use time and the use number of the app, and
   the intervention method has strength varying depending on at least one of the use time and the use number of the app.

19. The system of claim 12, wherein the interaction of the smart device associated with the app is reduced by delaying at least one of the start time of the app, the transition time between a plurality of user interfaces predetermined in relation to the app, the response time for the user input related to the app, and the network I/O speed for providing information provided as the response to data requested in relation to the app.

* * * * *